United States Patent
Teshima et al.

(10) Patent No.: US 7,429,922 B2
(45) Date of Patent: Sep. 30, 2008

(54) PORTABLE UNIT LOCATING SYSTEM AND METHOD

(75) Inventors: Kentaro Teshima, Kariya (JP); Kazuhiro Nakashima, Obu (JP); Haruyuki Tsuzuki, Toyota (JP)

(73) Assignee: Denso Corporation (JP)

( * ) Notice: Subject to any disclaimer, the term of this patent is extended or adjusted under 35 U.S.C. 154(b) by 294 days.

(21) Appl. No.: 11/484,729

(22) Filed: Jul. 12, 2006

(65) Prior Publication Data
US 2007/0030165 A1  Feb. 8, 2007

(30) Foreign Application Priority Data
Aug. 3, 2005  (JP) .............................. 2005-225544

(51) Int. Cl.
*G08B 1/00*  (2006.01)

(52) U.S. Cl. .............................. 340/539.32; 340/539.1; 340/426.13; 340/426.16; 340/426.17; 340/539.11

(58) Field of Classification Search ............ 340/539.32, 340/539.1, 425.5, 426.1, 426.13, 426.16, 340/426.17, 426.18, 539.11; 307/10.2
See application file for complete search history.

(56) References Cited

U.S. PATENT DOCUMENTS

| | | | | |
|---|---|---|---|---|
| 4,112,421 A | * | 9/1978 | Freeny, Jr. | 342/457 |
| 4,217,588 A | * | 8/1980 | Freeny, Jr. | 342/458 |
| 6,087,987 A | | 7/2000 | Bachhuber et al. | |
| 6,108,561 A | * | 8/2000 | Mallinckrodt | 455/522 |
| 2005/0143141 A1 | | 6/2005 | Ochi et al. | |
| 2006/0088081 A1 | * | 4/2006 | Withington et al. | 375/130 |
| 2006/0119467 A1 | | 6/2006 | Brillion et al. | |

FOREIGN PATENT DOCUMENTS

| | | |
|---|---|---|
| DE | 100 46 897 | 2/2004 |
| DE | 103 17 658 | 8/2005 |
| EP | 1 099 815 | 10/2000 |
| JP | 07-274259 | 10/1995 |
| JP | 10-059131 | 3/1998 |
| JP | 2000-185628 | 7/2000 |
| JP | 2002-201838 | 7/2002 |
| JP | 2004-084406 | 3/2004 |
| JP | 2005-207077 | 8/2005 |
| JP | 2005-220728 | 8/2005 |

OTHER PUBLICATIONS

German Office Action dated Feb. 28, 2008 issued in corresponding German Application No. 102006035841.4 with English translation.

* cited by examiner

*Primary Examiner*—Daryl C Pope
(74) *Attorney, Agent, or Firm*—Nixon & Vanderhye PC

(57) ABSTRACT

A portable unit locating system is incorporated in a vehicle equipment control system including a portable unit and an in-vehicle unit, which communicate each other for controlling vehicle equipment such as doors. The in-vehicle unit includes inside transmitters, a receiver, a comparison ECU and a display. The transmitters transmit respective request signals in a vehicle compartment. The comparison ECU determines whether any response signal has been received from the portable unit in response the request signals, while gradually varying output levels of the request signals. The comparison ECU then specifies a location of the portable unit based on a change in determination results. The display visually or audibly notifies the specified location of the portable unit to a vehicle user.

10 Claims, 3 Drawing Sheets

PORTABLE UNIT LOCATING SYSTEM AND METHOD

CROSS REFERENCE TO RELATED APPLICATION

This application relates to and incorporates herein by reference Japanese Patent Application No. 2005-225544 filed on Aug. 3, 2005.

FIELD OF THE INVENTION

The present invention relates to portable unit locating system and method that locate a portable unit, which a vehicle user carries for a remote vehicle control, in a vehicle compartment.

BACKGROUND OF THE INVENTION

In vehicle equipment control systems such as disclosed in JP 2002-201838A, an in-vehicle unit communicates with a portable unit carried by a vehicle user as an electronic key so that vehicle door locking and unlocking, steering unlocking, engine starting or the like may be controlled from remote locations. In some systems, this control is performed automatically as long as the user carries it with him without any manual operations on the portable unit by the user. As such it is likely that the user often forget where the portable unit is located in a vehicle.

It is proposed therefore to divide a vehicle compartment into a plurality of communication areas and provide a plurality of radio transmitters, which cover the divided areas, respectively. The transmitters are driven to transmit request signals in the compartment when a portable unit is to be located. When a response signal of the portable unit is received by any one of the transmitters, the location of the portable unit is specified based on which transmitter has received the response signal. This location is notified to the user by a display or a voice message. This system, however, requires more transmitters as the number of communication areas is increased to more finely specify the location of the portable unit.

SUMMARY OF THE INVENTION

The present invention therefore has an object to provide portable unit locating system and method, which locates a portable unit easily without increasing transmitters in a vehicle.

According to an aspect of the present invention, a portable unit locating system is incorporated in a vehicle equipment control system, which includes a portable unit and an in-vehicle unit, which communicate each other for controlling vehicle equipment such as doors. The in-vehicle unit includes an inside transmitter and a receiver. A request signal is transmitted from the transmitter in a vehicle compartment. It is determined whether any response signal has been received from the portable unit in response the request signal, while gradually varying an output level of the request signal. A location of the portable unit is specified based on a change in determination result. This specified location is visually or audibly notified to a vehicle user.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
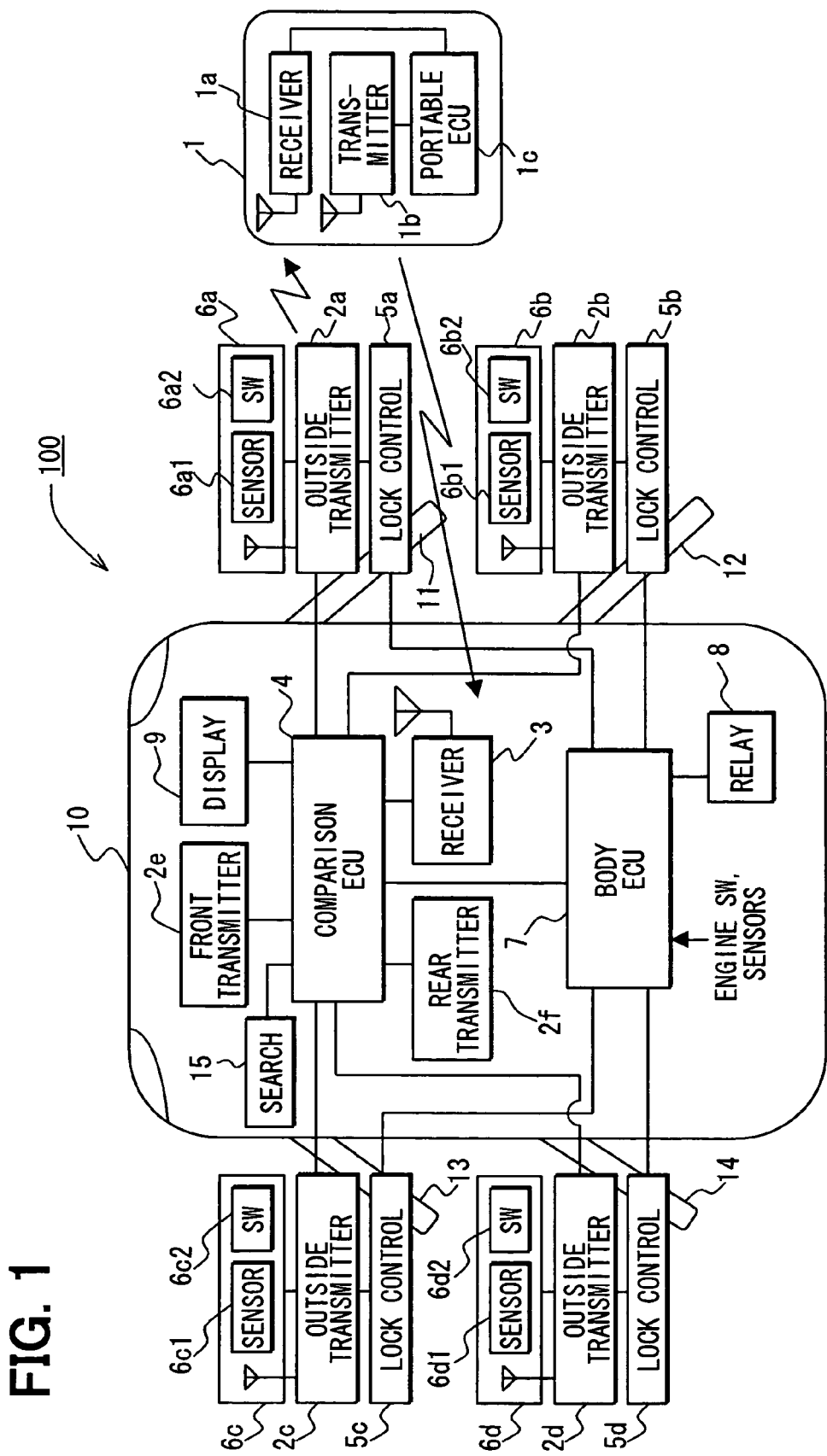
FIG. 1 is a schematic diagram showing a vehicle equipment control system incorporating a portable unit locating system according to an embodiment of the present invention.

A vehicle equipment control system incorporating a portable unit location system according to an embodiment is shown in FIG. 1. The system controls a lock or unlock mode of each door of a vehicle 10 in accordance with comparison of identification (ID) codes through two-way communication between a portable unit 1 and an in-vehicle unit 100 provided in the vehicle 10. The in-vehicle unit 100 controls a permission or inhibition mode for starting an engine of the vehicle 10 to improve security of the vehicle 10.

The portable unit 1 includes a receiver 1a and a transmitter 1b. The receiver 1a receives request signals from outside transmitters 2a to 2d and inside transmitters 2e, 2f of the in-vehicle unit 100. The transmitters 2e, 2f are provided as front and rear transmitters, which respectively provide front and rear communication areas. In response to each received request signal, the transmitter 1b transmits a response signal including, for example, an ID code. A portable unit ECU 1c is connected to the receiver 1a and the transmitter 1b, and executes various control processes and operations. More specifically, the portable unit ECU 1c performs operations, such as determination of the presence or absence of the request signal in accordance with the received signals of the receiver 1a, generation of the response signal inclusive of the ID code and the like, and control of the response signal to be transmitted from the transmitter 1b in response to the corresponding request signal.

The in-vehicle unit 100 includes the outside transmitters 2a to 2d provided in each door 11 to 14 of the vehicle 10, and the front and rear transmitters 2e, 2f provided in the compartment. The outside transmitters 2a to 2d and the front and rear transmitters 2e, 2f each transmit the request signal in accordance with a transmission instruction signal received from a comparison ECU 4 of the in-vehicle unit 100.

The transmission output level of each outside transmitter 2a to 2d is set to provide a communication area of about 0.7 to 1.0 m. When the vehicle 10 is parked, the outside transmitters 2a to 2d are periodically driven to transmit the request signals to form respective communication areas around the doors 11 to 14, respectively, When the user with the portable unit 1 enters any of these communications area, the portable unit 1 transmits the response signal responsively to the request signal.

The transmission output level of each front and rear transmitter 2e, 2f is set to provide respective communication areas in the compartment. The front and rear transmitters 2e, 2f are driven to transmit the request signals at the time of engine starting, door locking and the like. If the portable unit 1 transmits the response signal responsively to any of the request signals in the compartment, it is confirmed that the portable unit 1 is within one of the front and rear communication areas based on to which request signal the portable unit has responded.

Figure 2:
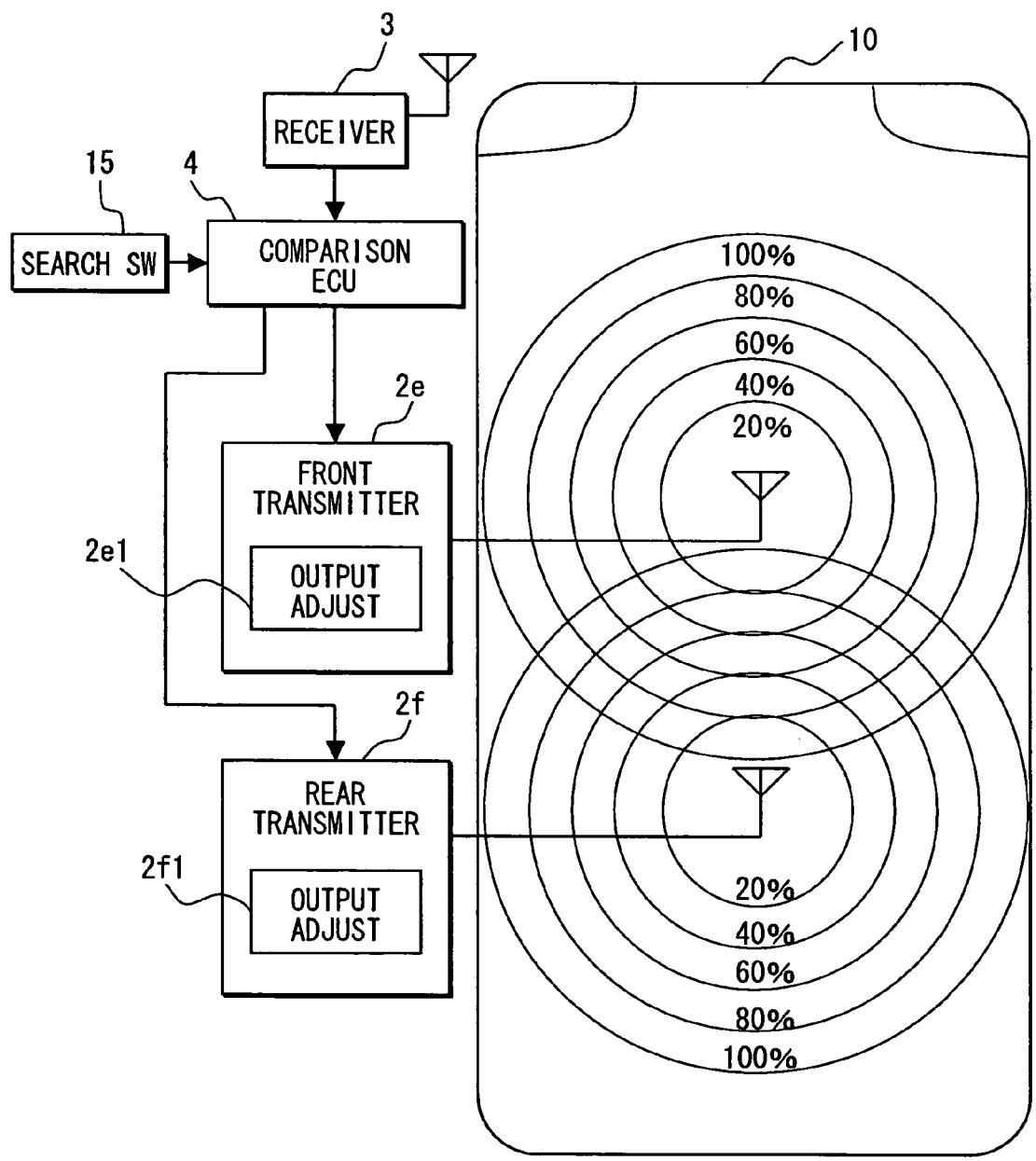
FIG. 2 is a schematic view showing communication areas of front and rear transmitters in the embodiment.

The transmission output levels of the front and rear transmitters 2e, 2f are variable to define different communication areas as shown in FIG. 2 to more finely locate the area where the portable unit 1 is. The front and rear transmitters 2e, 2f therefore include transmission output adjusting circuits 2e1, 2f1, respectively. The communication areas are changed as shown in FIG. 2, when the output level of each transmitter 2e, 2f is adjusted between a maximum level (100%) and a minimum level (20%) in response to operation of a search switch 15 by the user. The communication areas come to overlap more as the output levels are increased.

The front and rear transmitters 2e, 2f transmit the request signals in a relatively low frequency band (about 130 kHz) in comparison to the radio frequency band of the response signal, so that directivity of the request signals of the front and rear transmitters 2e, 2f is small. Thus, each communication area of the front and rear transmitters 2e, 2f is symmetrical about respective antennas.

The in-vehicle unit 100 further includes a display 9, which visually displays and audibly notifies the user the location of the portable unit 1 when specified. The display 9 may be a display of a navigation apparatus if the navigation apparatus is installed in the vehicle 10. The display 9 may also be a meter display provided in an instrument panel section.

In addition, the in-vehicle unit 100 includes a receiver 3. The receiver 3 is controlled to a response-signal receivable mode in synchronism with the operation of outputting transmission signals to the transmitters 2a to 2f, thereby to receive response signals transmitted from the portable unit 1. The response signal received by the receiver 3 is output to a comparison ECU 4.

The comparison ECU 4 performs comparison to determine whether a predetermined relationship, such as a matched relationship between an ID code included in the received response signal and a pre-registered registration code of each vehicle. Then, in response to the comparison result, i.e., YES (affirmative) or NO (negative), with a body ECU 7, the comparison ECU 4 controls, for example, a lock or unlock mode of each door and the permission or inhibition mode for starting the engine.

The body ECU 7 controls, for example, on/off operations for power supply to the respective equipment mounted in the vehicle 10, and outputs driving signals for controlling the respective lock or unlock modes of vehicle doors 11 to 14 to lock control units 5a to 5d provided in the respective doors 11 to 14. In the body ECU 7, there are input signals from, for example, respective sensors and switches (SW) to determine whether or not the condition for starting the engine is satisfied. More specifically, the body ECU 7 inputs signals of equipment provided near the driver's seat, such as, for example, an engine switch to be operated by the user to provide an instruction for starting or stopping the engine, a vehicle speed sensor for detecting the travel speed of the vehicle 10, a shift position sensor for detecting the shift position of a transmission (gear set), and a stop lamp switch for outputting an ON signal upon operation performed by a driver on the brake pedal.

In the event that it is determined that the condition for starting the engine is satisfied and hence power is supplied to the respective vehicle equipment, the body ECU 7 drives a relay circuit 8 and causes power to be supplied via the relay circuit 8 to the respective vehicle equipment from a battery (not shown).

The lock control units 5a to 5d provided in the respective doors 11 to 14 respectively include door lock motors (not shown) that forwardly/backwardly (reciprocally) rotate in response to a lock signal/unlock signal transmitted from the body ECU 7, thereby to lock or unlock the respective vehicle doors 11 to 14.

Touch sensors 6a1 to 6d1 are, respectively, provided in door handles 6a to 6d of the doors 11 to 14 of the vehicle 10, thereby to enable detecting that the user of the portable unit 1 has operated respective one of the door handles 6a to 6d by touching the respective one of the door handles 6a to 6d. In addition, door lock switches 6a2 to 6d2 formed as push switches are provided in the door handles 6a to 6d, respectively. Operation of the respective door lock switches 6a2 to 6d2 makes it possible to lock the doors 11 to 14. The respective door handles 6a to 6d operate as radio antennas for the outside transmitters 2a to 2d.

The door unlock or lock control may be attained in the following manner.

In the case that the vehicle 10 is being parked and its engine is not being operated with the respective doors 11 to 14 remaining locked, the comparison ECU 4 provides an instruction to the respective one of the outside transmitters 2a to 2d to perform request signal transmission periodically, that is, in units of the passage of a predetermined time. Thereby, the comparison ECU 4 verifies whether or not the user of the portable unit 1 has approached the vehicle 10, that is, whether the user is in any of the communication areas of the outside transmitters 2a to 2d.

In this case, the outside transmitters 2a to 2d, respectively, transmit request signals including ID codes unique to the respective outside transmitters 2a to 2d. The portable unit 1 is configured to transmit response signals respectively including the ID codes of the received request signal. Thereby, it can be determined to which one of the vehicle doors 11 to 14 the user of the portable unit 1 has approached. Alternatively, in order to identify the position of one of the vehicle doors 11 to 14 that the user of the portable unit 1 has approached, the comparison ECU 4 may be used to provide the instructions to the outside transmitters 2a to 2d to transmit the request signals not concurrently but sequentially.

When the portable unit 1 transmits the response signal in response to any one of request signals of the outside transmitters 2a to 2d, the response signal is received by the receiver 3 of the in-vehicle unit 100. The comparison ECU 4 performs the ID code comparison to determine whether or not the ID code included in the response signal satisfies a predetermined relationship, such as a matched relationship with the pre-registered registration code. It is preferred that the response signal also include an ID code specific to the portable unit 1, so that the comparison ECU 4 determines whether the portable unit 1 is an authorized one.

When the comparison ECU 4 has determined that the comparison result is YES, the comparison ECU 4 further determines the position of the user of the portable unit 1 from the ID code included in the response signal. Then, one of the touch sensors 6a1 to 6d1 of the vehicle doors 11 to 14 that corresponds to the position is activated, whereby to provide an instruction signal to the body ECU 7 to set the respective vehicle doors 11 to 14 to the unlock standby mode. In accordance with the instruction signal, the body ECU 7 sets the respective vehicle doors 11 to 14 to the unlock standby mode.

When the user of the portable unit 1 has touched any one of the door handles 6a to 6d of the vehicle doors 11 to 14 set to the unlock standby mode, then the door handle operation of the user of the portable unit 1 is detected by the touch sensor 6a1 to 6d1, and detection signal thereof is transmitted to the comparison ECU 4. In response thereto, the comparison ECU 4 provides to the body ECU 7 the instruction signal for unlocking all the vehicle doors 11 to 14. In accordance with the instruction signal, the body ECU 7 outputs an unlock drive signal to the lock control units 5a to 5d of the respective the vehicle doors 11 to 14, thereby to unlock the respective vehicle doors 11 to 14.

When the user enters the vehicle 1 and turns on the engine switch to operate the engine, the comparison ECU 4 may further perform permission or inhibition of engine starting based on the comparison result of ID codes.

When the user gets off the vehicle 10 after stopping the vehicle 10 and the engine, the user operates any one of the door lock switches 6a2 to 6d2 provided in the door handles to lock the doors 11 to 14. When the comparison ECU 4 detects this operation, it drives the outside transmitters 2a to 2d and the front and rear transmitters 2e, 2f to transmit respective request signals. If the receiver 3 receives no response signals from the portable unit 1 in response to the request signals of the front and rear transmitters 2e, 2f but receives a response signal including the proper ID code from the portable unit 1 in response to any one of the request signals of the outside transmitters 2a to 2d, the comparison ECU determines that the portable unit 1 has been taken out from the vehicle 1 and not left in the vehicle 1. The comparison ECU 4 instructs the body ECU 9 to drive the lock control units 5a to 5d to lock the doors 11 to 14.

Figure 3:
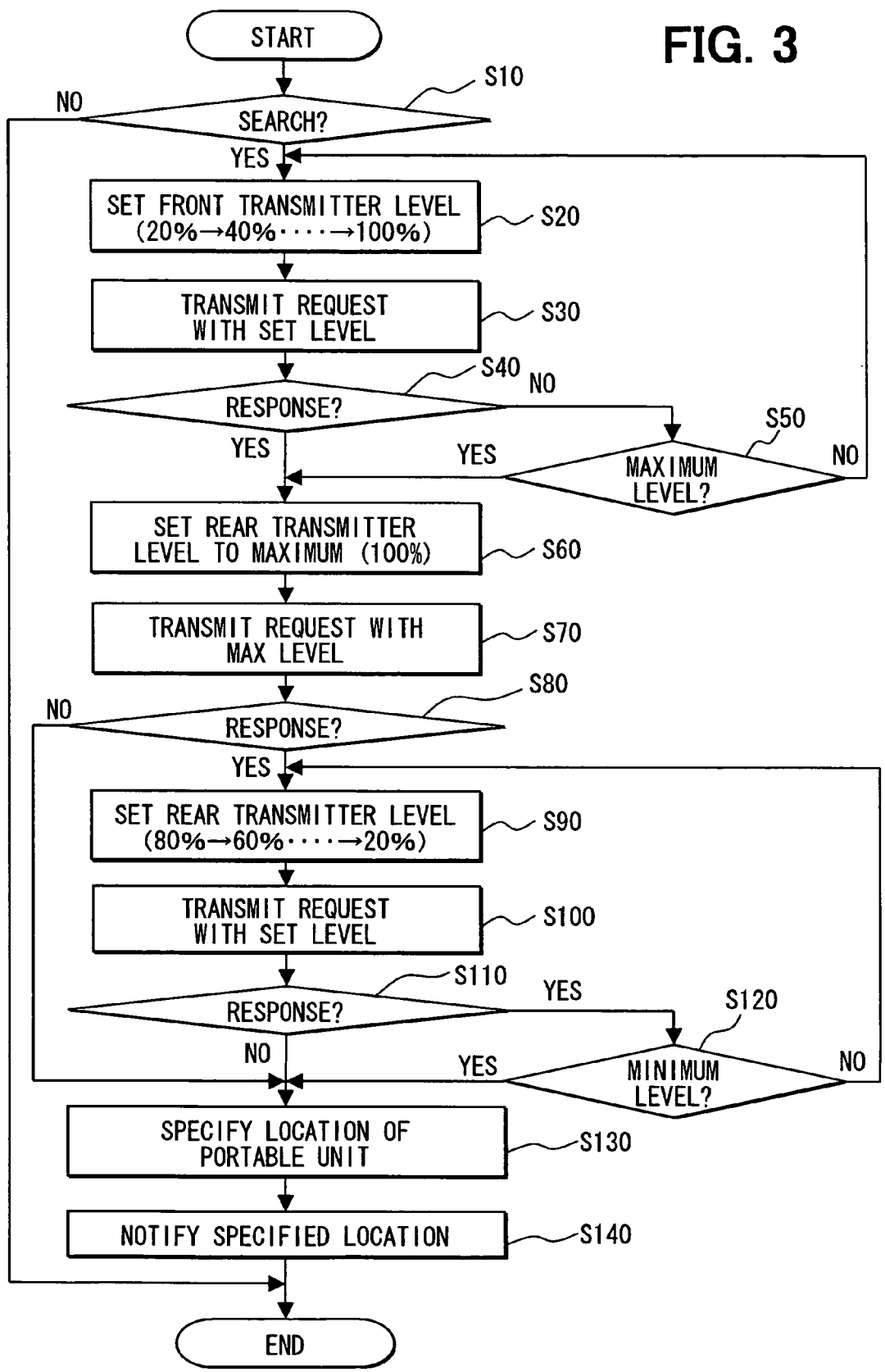
FIG. 3 is a flowchart showing search control processing performed in the embodiment.

The system also has a function of locating or searching for a portable unit in the vehicle 1 so that the user may locate the portable unit when it becomes missing in the vehicle. This function may be initiated by manually operating the search switch 15 or manually operating other existing switches in a predetermined combination or sequence. The comparison ECU 4 is programmed to execute portable unit locating processing as shown in FIG. 3.

It is first determined at step S10 whether the search switch 15 is turned on. If the determination result is NO, the processing ends. If the determination result is YES, searching in the front half of the compartment is started.

That is, the output signal level of the front transmitter 2e is set to a certain level between the minimum level and the maximum level at step S20. The output level is first set to the minimum (20% for instance). The front transmitter 2e is driven to transmit the request signal with the set output level at step S30. Thus, when the front transmitter 2e transmits the request signal for the first time, the request signal is rather weak and provides a small communication area just around the antenna of the front transmitter 2e.

It is then determined at step S40 whether the receiver 3 has received any response signal in response to the request signal transmitted at step S30. If no response signal has been received, it is then determined at step S50 whether the request signal has been transmitted with the maximum output level (100%). If the determination result is NO, the output level is updated to a new level at step S20, that is, increased to a higher level than before, and the request signal is transmitted again with this increased level at step S30. Until the response signal is received (YES at step S40) or the output level becomes the maximum (YES at step S50), the above steps S20 to S50 are repeated so that the communication area of the front transmitter 2e, that is, the search area, is gradually widened.

If the determination result at step S40 becomes YES indicating that the response signal of the portable unit 1 is received by the receiver 3, it is determined that the portable device 1 is within the front half of the compartment, that is, within the communication area corresponding to the last output level (80% for instance) of the front transmitter 2e but outside the communication area corresponding to the immediately preceding output level (60% for instance) of the front transmitter 2e. The processing thus proceeds to step S60. Further, if the determination result at step S50 is YES indicating that no response signal has been received although the output level of the request signal has already been increased to the maximum level (100%), the processing also proceeds to step S60 so that searching in the rear half of the compartment is started.

That is, the signal output level of the rear transmitter 2f is first set to the maximum level (100% for instance) at step S60, and the request signal is transmitted from the rear transmitter 2f with the maximum level at step S70. This request signal defines the maximum communication area in the rear half in the compartment. Then at step S80, it is determined whether any response signal has been received by the receiver 3.

If the determination result is NO, it is determined that the portable unit 1 is not within the rear half in the compartment. The location of the portable unit 1 is specified at step S130. Specifically, if the determination result at step S50 has been YES, it is determined that the portable device 1 is not left in the compartment. If the determination result at step S40 has been YES, it is specified that the portable device 1 is within the area in which the determination result at step S40 has changed from NO to YES.

If the determination result at step S80 is YES indicating that the portable device 1 is within the rear half, the output level is set to a decreased level (80% for instance) at step S90 and the request signal with this decreased output level is transmitted from the rear transmitter 2f at step S100, thus narrowing the communication area. It is then determined at step S110 whether any response signal has been received by the receiver 3.

If the determination result at step S110 is YES indicating that the response signal has been received, it is determined at step S120 whether the output level has already been decreased to the minimum level (20%) for instance. If this determination result is NO, the above steps S90 to S110 are repeated until the determination result at step S110 becomes NO indicating that no response signal has been received. Thus, the output level of the request signal is gradually decreased and hence communication area of the rear transmitter 2f is narrowed gradually to more finely specify the location of the portable unit 1 in the rear half of the compartment.

When the determination result at step S110 changes from YES to NO, it is determined at step S130 that the portable unit 1 is outside the communication area corresponding to the last output level but within the communication area corresponding to the immediately preceding output level. If the determination result at step S110 continuously remains YES even if the output level is decreased to the minimum level (20% for instance), that is, the determination result at S120 is YES, it is determined at step S130 that the portable unit 1 is left very closely to the antenna of the rear transmitter 2f.

As described above, the location of the portable unit 1 is specified at step S130 based on changes in receptions of the request signals from the front and rear transmitters 2e, 2f. The communication areas of the transmitters 2e, 2f are set to overlap as shown in FIG. 2. Therefore, the location of the portable unit 1 can be specified in three areas, that is, front half, rear half and overlapping part (front and rear halves).

This specified location in the compartment is notified visually by way of the display 9 or by other means at step S140, thus ending the search processing.

The above embodiment may be modified in many ways. For instance, the number of the inside transmitters may be one, three or more. The communication areas of all inside transmitters may be varied gradually in the same direction, that is, from narrow to wide or from wide to narrow. All inside transmitters may be driven to transmit respective request signals at the same time. It is preferable in this instance that the request signals include different ID codes and the response signal includes the ID code of the request signal to indicate to which the portable unit responded. The portable unit may be equipped with a sound generator so that the sound generator generates sound in response to the request signals from the inside transmitters to indicate the location of the portable unit in addition to the notification by the in-vehicle device such as the display, etc.

What is claimed is:

1. A system that allows two-way communication between a portable unit and an in-vehicle unit in a manner that the portable unit transmits a response signal including an ID code in response to a request signal transmitted from the in-vehicle unit, so that the in-vehicle unit receives the response signal from the portable unit, performs a comparison between the ID code included in the response signal and a pre-registered code, and controls vehicle equipment in accordance with a comparison result, wherein the in-vehicle unit comprises:

transmitter means that transmits the request signal in a vehicle compartment; and receiver means that receives the response signal from the portable unit, characterized by further comprising:

output varying means for varying an output level of the request signal transmitted from the transmitter means;

specifying means for specifying a location of the portable unit in the compartment based on changes in receptions of the response signal transmitted in response to the request signal of varying output level; and notifying means for notifying the location of the portable unit specified by the specifying means.

2. The system according to claim 1, wherein:

the output varying means gradually increases the output level of the request signal in steps; and the specifying means specifies the location of the portable unit based on a change from no reception to reception of the response signal.

3. The system according to claim 1, wherein:

the output varying means gradually decreases the output level of the request signal in steps; and the specifying means specifies the location of the portable unit based on a change from reception to no reception of the response signal.

4. The system according to claim 1, wherein:

the transmitter means includes a plurality of transmitters provided to form a plurality of communication areas, which partly overlap.

5. The system according to claim 1, wherein:

the notifying means notifies the location by image or sound; and the portable unit is caused to generate sound when the notifying means notifies the location of the portable unit.

6. A method for locating a portable unit in a compartment of a vehicle, the portable unit being carried by a vehicle user and capable of communication with an in-vehicle unit for controlling vehicle equipment, the method comprising:

transmitting, by the in-vehicle unit, a request signal in a vehicle compartment;

determining, by the in-vehicle unit, whether a response signal has been received from the portable unit in response the request signal;

specifying, by the in-vehicle unit, a location of the portable unit based on a change in determination result of the determining; and notifying, by the in-vehicle unit, a specified location of the portable unit in the compartment, characterized by varying, by the in-vehicle unit, an output level of the request signal gradually until the response signal is determined to have been received.

7. The method according to claim 6, wherein:

the transmitting transmits the request signal at least first and second places in the compartment so that each request signal transmitted at the first and second places overlap between the first and second places.

8. The method according to claim 7, wherein:

the varying increases and decreases gradually the request signal transmitted at the first and the second places, respectively.

9. The method according to claim 7, wherein:

the transmitting transmits the request signal at two places, which are in a front half and a rear half in the compartment.

10. The method according to claim 6, wherein:

the transmitting is started only when a predetermined operation by the user is made.

* * * * *